US008116535B2

(12) United States Patent
Nozawa

(10) Patent No.: US 8,116,535 B2
(45) Date of Patent: Feb. 14, 2012

(54) IMAGE TRIMMING APPARATUS

(75) Inventor: Kenji Nozawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 989 days.

(21) Appl. No.: 11/782,436

(22) Filed: Jul. 24, 2007

(65) Prior Publication Data
US 2008/0025558 A1 Jan. 31, 2008

(30) Foreign Application Priority Data
Jul. 25, 2006 (JP) ................................ 2006-202608

(51) Int. Cl.
*G06K 9/00* (2006.01)
(52) U.S. Cl. .......................... 382/118; 382/100; 382/173
(58) Field of Classification Search .................. 382/118, 382/173, 181
See application file for complete search history.

(56) References Cited

U.S. PATENT DOCUMENTS

| | | | | |
|---|---|---|---|---|
| 6,389,155 | B2 * | 5/2002 | Funayama et al. | 382/118 |
| 6,829,432 | B2 * | 12/2004 | Misumi et al. | 396/1 |
| 6,907,136 | B1 * | 6/2005 | Shigemori | 382/118 |
| 7,034,848 | B2 * | 4/2006 | Sobol | 345/620 |
| 7,739,598 | B2 * | 6/2010 | Porter et al. | 715/723 |
| 2002/0085771 | A1 * | 7/2002 | Sakuramoto | 382/282 |
| 2003/0012435 | A1 * | 1/2003 | Forde | 382/167 |
| 2003/0044083 | A1 * | 3/2003 | Mekata | 382/282 |
| 2003/0086134 | A1 * | 5/2003 | Enomoto | 358/538 |
| 2005/0013599 | A1 * | 1/2005 | Nakanishi et al. | 396/2 |
| 2005/0031173 | A1 * | 2/2005 | Hwang | 382/118 |
| 2005/0058369 | A1 * | 3/2005 | Sanse et al. | 382/282 |
| 2005/0117802 | A1 * | 6/2005 | Yonaha et al. | 382/173 |
| 2005/0147292 | A1 * | 7/2005 | Huang et al. | 382/159 |
| 2005/0207646 | A1 * | 9/2005 | Shigemori | 382/173 |
| 2005/0234324 | A1 | 10/2005 | Sugimoto | |
| 2006/0056668 | A1 * | 3/2006 | Ozaki | 382/118 |
| 2006/0147093 | A1 * | 7/2006 | Sanse et al. | 382/115 |

(Continued)

FOREIGN PATENT DOCUMENTS
CN 1517951 A 8/2004

(Continued)

OTHER PUBLICATIONS

Explanation of circumstances concerning accelerated examination, filed Sep. 28, 2010, in corresponding JP Application No. 2006-202608, 7 pages in English and Japanese.

*Primary Examiner* — Jason M Repko
*Assistant Examiner* — Gandhi Thirugnanam
(74) *Attorney, Agent, or Firm* — Sughrue Mion, PLLC

(57) ABSTRACT

The present invention provides an image trimming apparatus, comprising: a reading device which reads out an original image to be trimmed from an original recording device in which the original image is recorded; a display device which displays an image based on the read out original image; a manual trimming indicating device which indicates a trimming region by a manual operation with respect to the image displayed on the displaying device; an automatic trimming indicating device which, when the read out original image includes a face image of a person, automatically indicating a predetermined trimming region having the face image at the time of the manual operation; and a trimming device which cuts out the image within the trimming region indicated by the manual trimming indicating device or the automatic trimming indicating device from the original image of the image displayed on the displaying device.

20 Claims, 13 Drawing Sheets

U.S. PATENT DOCUMENTS

| | | | |
|---|---|---|---|
| 2006/0204106 A1* | 9/2006 | Yamaguchi | 382/203 |
| 2006/0274960 A1* | 12/2006 | Tamaru | 382/274 |
| 2008/0025578 A1* | 1/2008 | Nozawa | 382/118 |
| 2008/0304718 A1* | 12/2008 | Ryuto et al. | 382/118 |
| 2009/0142003 A1* | 6/2009 | Fukuda | 382/286 |

FOREIGN PATENT DOCUMENTS

| | | |
|---|---|---|
| EP | 1 558 015 A1 | 7/2005 |
| JP | 09-101579 A | 4/1997 |
| JP | 2000-036032 A | 2/2000 |
| JP | 2002-199221 A | 7/2002 |
| JP | 2003-209683 A | 7/2003 |
| JP | 2003-319169 A | 11/2003 |
| JP | 2004-005384 A | 1/2004 |
| JP | 2004-096487 A | 3/2004 |
| JP | 2004-96488 A | 3/2004 |
| JP | 2005-285035 A | 10/2005 |
| WO | 2004/036900 A1 | 4/2004 |

* cited by examiner

FIG.9
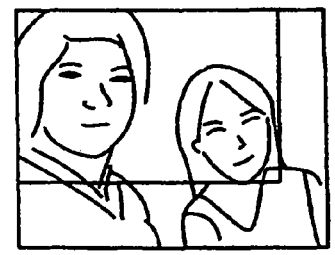

COMPOSITION EXAMPLE OF PHOTOGRAPH OF PERSON

FIG.13 MAXIMUM AND MINIMUM CUT OUT REGION FOR TRIMMING PHOTOGRAPH OF UPPER BODY OF OBJECT PERSON

IMAGE TRIMMING APPARATUS

BACKGROUND OF THE INVENTION

1. Field of the Invention

The present invention relates to an apparatus having a function to trim an image.

2. Description of the Related Art

Conventionally, a technology for trimming an image to a proper size is known. For example, according to Japanese Patent Application Laid-Open No. 2004-96486, a head portion and a chest portion of a person in an image are identified to perform a trimming of the image to a proper size.

SUMMARY OF THE INVENTION

In the technology disclosed in Japanese Patent Application Laid-Open No. 2004-96486, images can be automatically trimmed to a certain size such as that of a photo for identification purpose, but the size does not always cover the angle of view a user wants. The present invention was made in view of the problem, and provides an apparatus having a function for displaying an area of an image to a user as a reference for trimming of the image by using face information to allow the user to optionally change a magnification and an angle of view of the image.

To achieve the above object, an image trimming apparatus according to a first aspect of the present invention comprises: a reading device which reads out an original image to be trimmed from an original recording device in which the original image is recorded; a display device which displays an image based on the read out original image; a manual trimming indicating device which indicates a trimming region by a manual operation with respect to the image displayed on the displaying device; an automatic trimming indicating device which, when the read out original image includes a face image of a person, automatically indicating a predetermined trimming region having the face image at the time of the manual operation; a trimming device which cuts out the image within the trimming region indicated by the manual trimming indicating device or the automatic trimming indicating device from the original image of the image displayed on the displaying device.

According to the first aspect, since both of a manual trimming indicating device and an automatic trimming indicating device are used, a user is able to quickly indicate a desired trimming region. In other words, when an original image to be trimmed includes a face image of a person, first, an operation of the automatic trimming indicating device causes a predetermined trimming region having the face image to be automatically indicated. Then, the user operates the manual trimming indicating device to correct the trimming region with respect to the automatically indicated trimming region, so that the user is able to indicate the desired trimming region. Finally, the image within the indicated trimming region is cut out of the original image.

As described in a second aspect, the image trimming apparatus according to the first aspect comprises a recording device which records the image cut out by the trimming device into the original recording device. The cut out image is recorded in the original recording device in which the original image is recorded.

As described in a third aspect, in the image trimming apparatus according to the first or second aspect, the manual trimming indicating device includes a zoom indicating device which indicates a zoom factor for change the size of the image displayed on the displaying device, and a movement indicating device which causes the enlarged image displayed on the displaying device to be moved to another position within the region of the original image. In other words, the image trimming apparatus is configured to set the entire image which is displayed on the displaying device as an image to be trimmed, so that a user is able to indicate a change of size and movement of the image (trimming region) while seeing the displayed image.

As described in a fourth aspect, in the image trimming apparatus according to any one of the first to third aspects, the automatic trimming indicating device indicates a size of a photograph of an upper body of an object person as a predetermined trimming region. This is because a portrait photograph is generally photographed to have the size of a photograph of an upper body of an object person.

As described in a fifth aspect, in the image trimming apparatus according to any one of the first to third aspects, when the read out original image includes a plurality of face images of persons, the automatic trimming indicating device indicates a predetermined trimming region which includes all of the face images. This enables a trimming of an original image to a proper size so that the trimmed image includes all of the face images of the original image.

As described in a sixth aspect, in the image trimming apparatus according to any one of the first to fourth aspects, when the read out original image includes a plurality of face images of persons, the automatic trimming indicating device selects a face image of one of the persons on the basis of a manual operation, and automatically indicates a predetermined trimming region which includes the selected face image of the person. Therefore, the image trimming apparatus is able to select certain faces out of plurality of faces in an original image and quickly indicate a trimming region a user desires.

According to the present invention, when an original image to be trimmed includes a face image of a person, the use of both of a manual trimming indicating device and an automatic trimming indicating device enables a quick indication of a trimming region a user desires, so that an image including the face image of proper size in proper position is able to be cut out of the original image.

BRIEF DESCRIPTION OF THE DRAWINGS

FIG. 9 is a view showing an example of image which is cut out and displayed by a cutting out process according to the second embodiment;

DETAILED DESCRIPTION OF THE PREFERRED EMBODIMENTS

Now, preferred embodiment of the present invention will be explained below with reference the drawings.

First Embodiment

Figure 1:
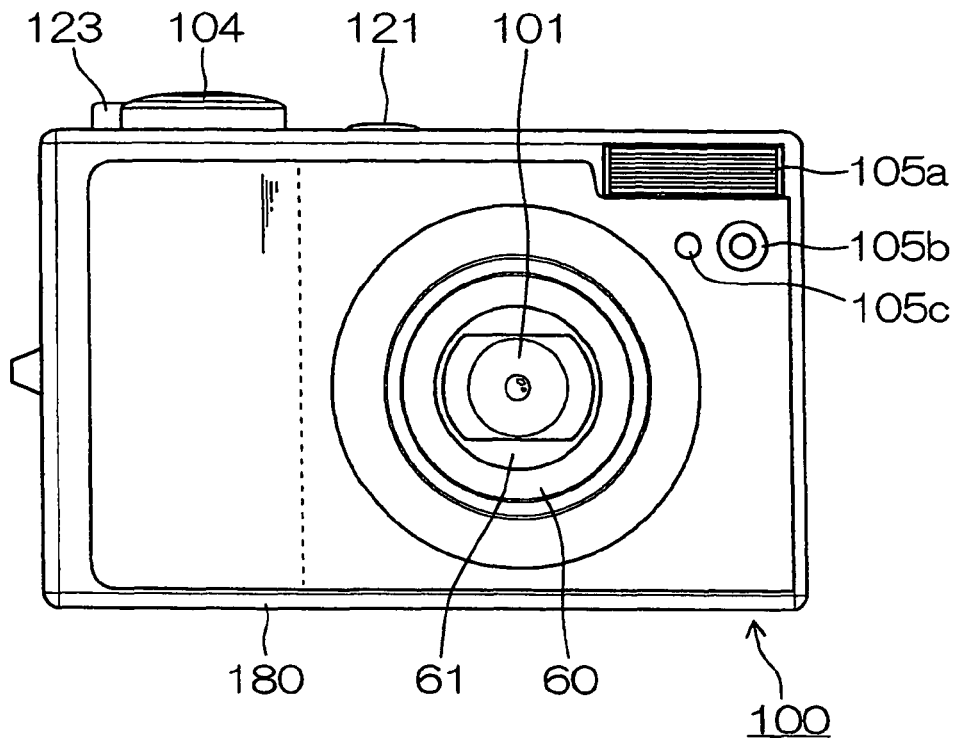
FIG. 1 is a front view showing a digital camera.

FIG. 1 is a front view showing a digital camera (hereinafter, simply referred to as camera) 100 according to a preferred embodiment of the present invention.

The camera 100 has a lens barrel 60 on the front surface thereof, and the lens barrel 60 is provided with a built-in photographing lens 101 including a zoom lens 101a and a focusing lens 101b, so that a movement of the zoom lens 101a in the direction of the optical axis enables a focal length adjustment, and also a movement of the focusing lens 101b in the direction of the optical axis enables a focus adjustment.

The lens barrel 60 advances and retracts between a wide angle end for the shortest focal length and a telephoto end for the longest focal length, both ends being set in advance, so as to be projected out of and housed in a camera body 180. In FIG. 1, the lens barrel 60 is retracted in the camera body 180.

The camera 100 is also provided with a lens cover 61 for protecting the photographing lens 101 by covering the front surface of the photographing lens 101 to shield it from the outside while the camera 100 is not operated for photographing, and for exposing the photographing lens 101 to the outside for image pickup.

The lens cover 61 is configured with an openable and closable mechanism for covering the front surface of the photographing lens 101 at its open position, and exposing the front surface of the photographing lens 101 to the outside at its closed position. The lens cover 61 is interlocked to a power button 121 to be opened/closed. In FIG. 1, the lens cover 61 is opened.

The camera 100 has a mode dial 123 provided with a central release button 104, and a power button 121 on the top surface thereof, and has an electronic flash unit 105a, an AF auxiliary light lamp 105b, a self-timer lamp 105c and the like on the front surface thereof.

Figure 2:
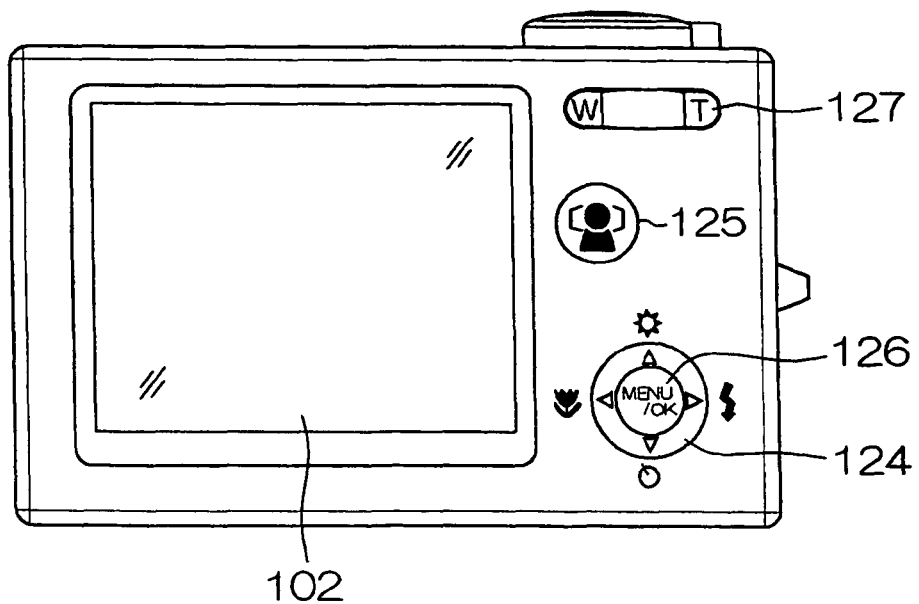
FIG. 2 is a rear view showing a digital camera.

FIG. 2 is a back view showing the camera 100. The camera 100 has a zoom switch 127 on the rear surface thereof A continuous pressing of a telephoto (T) side of the zoom switch 127 causes the lens barrel 60 to be projected toward the telephoto side, and a continuous pressing of the other side (W) of the zoom switch 127 causes the lens barrel 60 to move toward the wide angle side.

The camera 100 also has an image display LCD 102, a crosskey 124, a face button 125, and an information position specifying key 126 on the rear surface thereof The crosskey 124 is an operation system to set a display brightness control, a self-timer, a macro photography, and a flash photography at the top, bottom, left, and right portions thereof respectively. As explained below, a pressing of the bottom key of the crosskey 124 sets a self photographing mode in which a main CPU 20 causes a CCD 132 to operate a shutter operation after a clocking of the self-timer circuit 83 is completed. And a pressing of the face button 125 in setting a photographing mode starts a face detection which will be described below.

Figure 3:
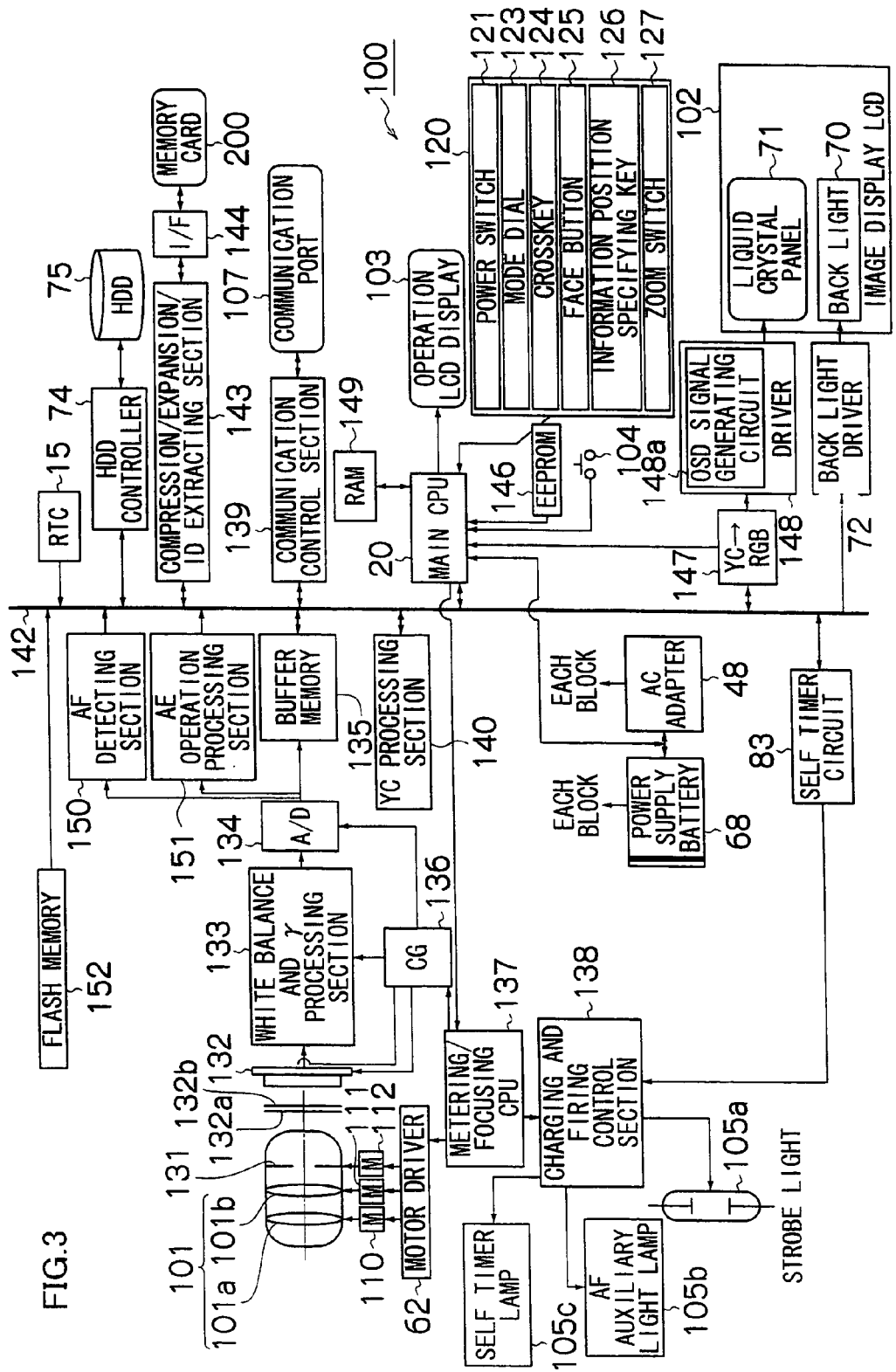
FIG. 3 is a block diagram showing a digital camera.

FIG. 3 is a block diagram of the camera 100 according to the first embodiment. The camera 100 is provided with an operating section 120 for various operations associated with a use of the camera 100 by a user. The operating section 120 includes a power button 121 for supplying power to operate the camera 100, a mode dial 123 for selecting an auto photography, a manual photography or the like, a crosskey 124 for setting or selecting different menu or zooming, a face button 125, and an information position specifying key 126 for implementing or canceling the menu selected by the crosskey 124.

The camera 100 is also provided with an image display LCD 102 for displaying a photographed image, reproduced image or the like, and an operation LCD display 103 for assisting the operations.

The camera 100 includes a release button 104. A pressing of the release button 104 informs a main CPU 20 of a start of photographing. The camera 100 is switchable between a photographing mode and a reproducing mode by using a predetermined menu screen. The camera 100 is also provided with an AF auxiliary light lamp 105b having light emitting diodes (LED) for emitting a spot light to an object in a contrast AF mode, and a flash operation device having an electronic flash unit 105a for flashing light.

The camera 100 is also provided with a photographing lens 101, an aperture 131, and a CCD image sensor 132 (hereinafter, simply referred to as CCD 132) which is an image pickup element for converting the object image which is formed through the photographing lens 101 and the aperture 131 into an analog image signal. The CCD 132 generates an image signal by accumulating the charges generated by the object light incident on the CCD 132 for a variable charge storage time (exposure time). The CCD 132 sequentially outputs an image signal for each frame at a timing synchronized with the vertical synchronizing signal VD which is output from a CG section 136.

When the used image pickup element is the CCD 132, an optical lowpass filter 132a is provided thereto which removes unnecessary high frequency components in an incident light in order to prevent generation of a color error signal, moire fringe or the like. Also, an infrared cut filter 132b is provided for absorbing or reflecting the infrared rays of the incident light to correct the sensitivity characteristics inherent to the CCD sensor 132 which has a high sensitivity to a longer wavelength range. The optical lowpass filter 132a and infrared cut filter 132b may be arranged in any manner without being limited to any particular aspect.

The camera 100 is also provided with a white balance and γ processing section 133 which includes an amplifier where amplification factor is variable, for adjusting the white balance of the object image represented by the analog image signal from the CCD sensor 132, controlling the slope (γ) of the straight line in the gradient characteristics of the object image, and amplifying the analog image signal.

The camera 100 is also provided with an A/D converting section 134 for A/D converting the analog signal from the white balance and γ processing section 133 into digital R, G, and B image data, and a buffer memory 135 for storing the R, G, and B image data from the A/D converting section 134.

The R, G, and B image data obtained by the A/D converting section 134 is also input to an AF detecting section 150. The AF detecting section 150 integrates and averages the R, G, and B image data on the basis of a predetermined divided area in one screen and a color component of the screen, and further calculates the integral average values Ir, Ig, and Ib of the R, G, and B image data for the entire areas for each frame. The integral average values Ir, Ig, and Ib are the received amounts of visible light in R, G, and B, respectively.

However, the received amounts Ir, Ig, and Ib of visible light in R, G, and B can also be detected by an optical sensor (not shown) other than CCD 132 which has sensitivities for each visible light in R, G, B,.

The camera 100 is also provided with the CG (clock generator) section 136, a CPU for metering/focusing CPU 137 a charging and flashing control section 138, a communication control section 139, a YC processing section 140, and a power supply battery 68.

The CG section 136 outputs vertical synchronizing signals VD for driving the CCD 132, driving signals including a high speed output pulse P, control signals for controlling the white balance and γ processing section 133 and the A/D converting section 134, and control signals for controlling the communication control section 139. The CG section 136 receives control signals which are input by a metering/focusing CPU 137.

The metering/focusing CPU 137 controls a zoom motor 110, a focus motor 111, and an aperture motor for aperture adjustment 112 to drive the zoom lens 101a, focusing lens 101b, aperture 131 respectively, so that the distance to the object is calculated (focusing), and the CG section 136 and the charging and flashing control section 138 are controlled. The driving of the zoom motor 110, the focus motor 111, and the aperture motor 112 is controlled by a motor driver 62, control command for motor driver 62 is sent from the metering/focusing CPU 137 or the main CPU 20.

The driving source of the zoom lens 101a, the focusing lens 101b, the aperture 131, and the AF auxiliary light lamp 105 is not necessarily limited to various motors such as the zoom motor 110, the focus motor 111, and the aperture motor 112, and may be an actuator for example.

The metering/focusing CPU 137 measures the brightness of the object (calculation of EV value) based on the image data (through image) periodically obtained (every 1/30 seconds to 1/60 seconds) by the CCD 132 when the release button 104 is half pressed (S1 is on).

That is, an AE operation processing section 151 integrates the R, G, and B image signals output from the A/D converting section 134, and provides the resultant integrated value to the metering/focusing CPU 137. The metering/focusing CPU 137 detects an average brightness of the object (object luminance) based on the integrated value input from the AE operation processing section 151, and calculates an exposure value (EV value) which is appropriate to photographing.

Then, the metering/focusing CPU 137 determines an exposure value including an aperture value (F value) of the aperture 131 and an electronic shutter (shutter speed) of the CCD 132 based on the obtained EV value and according to a predetermined program diagram (AE operation).

A full pressing of the release button 104 (S2 is on) causes the metering/focusing CPU 137 to drive the aperture 131 based on the determined aperture value, control the diameter of the aperture 131, and control the charge storage time at the CCD 132 via the CG 136 based on the determined shutter speed.

The AE operation includes aperture priority AE, shutter speed priority AE, program AE, and the like, and either operation is controlled to pickup image with a proper exposure, by measuring an object luminance and photographing with an exposure value, that is, a combination of an aperture value and a shutter speed, which is determined based on the measured value of the object luminance. This achieves an elimination of the troublesome process to determine an exposure.

The AF detecting section 150 extracts an image data, which corresponds to the detecting range selected by the metering/focusing CPU 137, from the A/D converting section 134. A focal position is detected using the characteristics of a high frequency component in the image data which has the maximum amplitude at the focused point. The AF detecting section 150 integrates the high frequency components in the extracted image data for one field so as to calculate an amplitude value. The AF detecting section 150 serially performs the calculation of the amplitude value while the metering/focusing CPU 137 controls the focus motor 111 to drive the zoom lens 101a to move within the movable range, that is between an infinite side (INF point) and a near side end (NEAR point), and sends the detected value to the metering/focusing CPU 137 when the maximum amplitude is detected.

The metering/focusing CPU 137, after obtaining the detected value, issues a command to the focus motor 111 to cause the focusing lens 101b to move to the focused position corresponding to the detected value. The focus motor 111 causes the focusing lens 101b to move to the focused position, in response to the command issued by the metering/focusing CPU 137 (AF operation).

The metering/focusing CPU 137 is connected to the release button 104 by way of the communication with the main CPU 20, and when a user presses the release button 104 halfway, the detection of a focused position is performed. The metering/focusing CPU 137 is connected to the zoom motor 110, so that when the main CPU 20 acquires a command for a zooming in the TELE direction or WIDE direction by the zoom switch 127 from a user, a driving of the zoom motor 110 allows the zoom lens 101a to move between the WIDE end and the TELE end.

The charging and flashing control section 138 charges a flashing capacitor (not shown) for flashing the electronic flash unit 105a when powered by a power battery 68, and controls the flashing of the electronic flash unit 105a.

The charging and flashing control section 138 controls the power supply to the self-timer lamp (tally lamp) 105c and the AF auxiliary light lamp 105b so that a desired light amount can be obtained at a desired timing, in response to the start of the charge of the power battery 68 and the receipt of various signals including the half pressed/fully pressed operation signal of the release button 104 and the signals showing the light amount and flashing timing from the main CPU 20 and the metering/focusing CPU 137.

The self-timer lamp 105c may use LEDs and the LEDs may be common to those used in the AF auxiliary light lamp 105b.

The main CPU 20 is connected to the self-timer circuit 83. When a self photographing mode is set, the main CPU 20 performs a clocking based on a fully pressed signal of the release button 104. During the clocking, the main CPU 20 causes the self-timer lamp 105c to blink with the blinking speed being increased as the remained time decreases, through the metering/focusing CPU 137. The self-timer circuit 83 inputs a clocking completion signal to the main CPU 20 upon the completion of the clocking. Then the main CPU 20 causes the CCD 132 to perform a shutter operation based on the clocking completion signal.

The communication control section 139 is provided with a communication port 107. The communication control section 139 functions to perform a data communication with the external apparatus by outputting an image signal of the object photographed by the camera 100 to the external apparatus such as a personal computer having a USB terminal and allowing such an external apparatus to input an image signal to the camera 100. The camera 100 has a function which is mimic to the switching function of a standard camera for photographing onto a roll of a film to switch between ISO film speeds 80, 100, 200, 400, 1600, and when a film speed of ISO 400 or more is selected, the amplification factor of an amplifier included in the white balance and γ processing section 133 switches to a high sensitivity mode in which the amplification factor is set to be higher than a predetermined amplification factor. The communication control section 139 disconnects the communication with an external apparatus during the photographing in a high sensitivity mode.

The camera 100 is further provided with a compressing/expanding/ID extracting section 143 and an I/F section 144. The compressing/expanding/ID extracting section 143 reads out an image data stored in the buffer memory 135 through a bus line 142 and compresses the image data, which is stored in the memory card 200 via the I/F section 144. The compressing/expanding/ID extracting section 143 also extracts an identification number (ID) unique to the memory card 200 when it reads out an image data stored in the memory card 200, so that the compressing/expanding/ID extracting section 143 reads out the image data stored in the memory card 200, and expands and stores it in the buffer memory 135.

A Y/C signal stored in the buffer memory 135 is compressed by the compressing/expanding/ID extracting section 143 according to a predetermined format, and then is recorded to a removable medium such as the memory card 200 or built-in high-capacity storage media such as a hard disk (HDD) 75 via the I/F section 144 in a predetermined format (for example, Exif (Exchangeable Image File Format) file). A recording of a data to the hard disk (HDD) 75 or a reading of a data from the hard disk (HDD) 75 is controlled by the hard disk controller 74 in response to a command issued by the main CPU 20.

The camera 100 is also provided with the main CPU 20, an EEPROM 146, a YC/RGB conversion section 147, and a display driver 148. The main CPU 20 provides overall controls of the camera 100. The EEPROM 146 stores individual data and programs unique to the camera 100. The YC/RGB conversion section 147 converts a color video signal YC generated at the YC processing section 140 into a three-color RGB signal, and outputs the converted signal to the image display LCD 102 via the display driver 148.

The camera 100 has an AC adapter 48 and a power battery 68 removably attached thereto for an electric power supply from an AC power source. The power battery 68 may be a rechargeable secondary battery such as a Nickel-Cadmium battery, a nickel hydrogen battery, or a lithium ion battery. Alternatively, the power battery 68 may be a single use primary battery such as a lithium battery or an alkaline battery. The power battery 68 is mounted in a battery housing chamber (not shown) to be electrically connected to each circuit of the camera 100.

When the AC adapter 48 is mounted to the camera 100 for an electric power supply from the AC power source to the camera 100 via the AC adapter 48, even if the power battery 68 is mounted to the battery housing chamber, the electric power output from the AC adapter 48 has the priority to be supplied to each section of the camera 100 as a driving electric power. When the AC adapter 48 is not mounted to the camera 100 and the power battery 68 is mounted to the battery housing chamber, the electric power output from the power battery 68 is supplied to each section of the camera 100 as a driving electric power.

Although not shown, the camera 100 is provided with a backup battery other than the power battery 68 which is mounted to the battery housing chamber. The built-in backup battery may be a dedicated secondary battery which is charged by the power battery 68, for example. The backup battery supplies power to the basic functions of the camera 100 when the power battery 68 is not mounted to the battery housing chamber for its replacement or removal.

That is, a stoppage of power supply from the power battery 68 or the AC adapter 48 causes a switching circuit (not shown) to connect the backup battery to a RTC 15 for a power supply to the circuits. This enables a continuous power supply to the basic functions including the RTC 15 until the end of the useful life of the backup battery 29.

The RTC (Real Time Clock) 15 is a dedicated chip for clocking, and remains in continuous operation with the electric power supply from the backup battery even while a power supply from the power battery 68 or the AC adapter 48 is stopped.

The image display LCD 102 is provided with a back light 70 which illuminates a transmissive or semi-transmissive liquid crystal panel 71 from its rear surface side, and in a power saving mode, the main CPU 20 controls the brightness (luminance) of the back light 70 via a backlight driver 72, so that the power consumption by the back light 70 can be reduced. The power saving mode can be turned on/off when the information position specifying key 126 of the operation section 120 is pressed to cause the image display LCD 102 to display a menu screen and a predetermined operation is executed on the menu screen.

Figure 4:
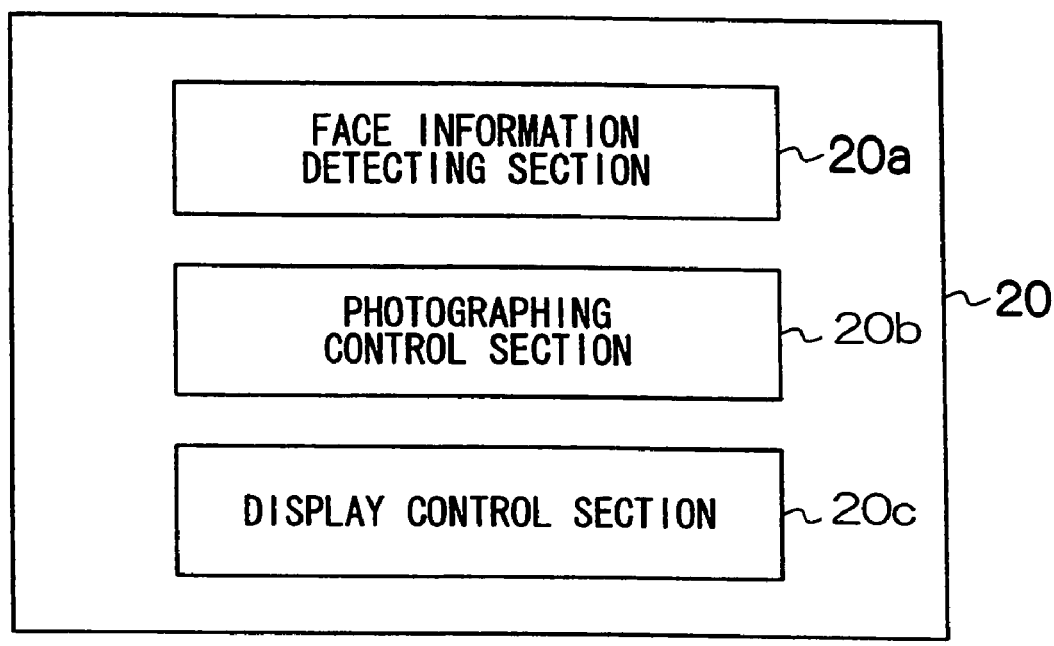
FIG. 4 is a schematic view showing a program which is executed by a main CPU according to a first embodiment.

FIG. 4 is a block diagram conceptually showing a program according to a first embodiment, which is implemented by the main CPU 20. The main CPU 20 reads out the face detecting section 20a, the photographing control section 20b, and the display control section 20c which are the programs stored in a computer readable storage medium such as an EEPROM 146 or a hard disk 75 into the RAM 145 and executes them. These sections may be simply referred to a program.

A face information detecting section 20a detects a face area which includes a face portion of a person from an image read out from the memory card 200 or from a through image which is sequentially recorded in a buffer memory 135. The detection of a face area may be performed by using the technology disclosed in Japanese Patent Application Laid-Open No. H9-101579 filed by the applicant of the present invention.

In the technology, it is determined if the color tone of each pixel in a photographed image is within the skin color range or not so that a skin color region and a non skin color region of the image are divided, and an edge in the image is detected so that every point of the image is categorized into an edge part or a non-edge part. Then, a region which locates in the skin color region, is consisted of the pixels categorized as the non-edge part, and is surrounded by the pixels determined to be the edge part is extracted as a face candidate region, and then it is determined if the extracted face candidate region corresponds to the face of the person or not, thereby a region is detected as a face area based on the determined result. Alternatively, a face area may be detected by using the method described in Japanese Patent Application Laid-Open No. 2003-209683 or Japanese Patent Application Laid-Open No. 2002-199221.

The face information detecting section 20a also detects a position and size of a detected face area, a probability of face detection (accuracy), an angle of the face area relative to the vertical direction, a direction in which an image is rotated to make the detected face area upright (for example, a rotation direction which substantially directs the head up and the chin down. Hereinafter, this direction is simply referred to as a rotation direction), and a predetermined default cut out region based on the face area (e.g. a photograph of an upper body of an object person which will be described below). The above listed face area, position of face area, size, probability of face detection, rotation direction are called face information as a group. The detection of a face area may be performed by using the method described in Japanese Patent Application Laid-Open No. 2005-285035. The face information detecting section 20a stores detected face information in the buffer memory 135. The face information may be stored with an image as tag information of an image file that includes the image.

A photographing control section 20b supervises a preparation for photographing such as AF/AE and a control of image obtaining processes for recording, in response to a half pressed or fully pressed release switch 104. The AF/AE may be performed on a face area detected by the face information detecting section 20a.

A display control section 20c sends a command to a built-in OSD signal generating circuit 148a in the driver 148 to generate a signal to display character and symbol information including shutter speed, aperture value, maximum number of photographs that can be taken, date and time of photograph, warning message, and graphical user interface (GUI). Then, the OSD signal generating circuit 148a outputs a signal which is mixed with the image signal from a YC/RGB converting section 147 as needed to be supplied to the liquid crystal panel 71. This allows a combined image which includes a through image or reproduced image and the characters and the like combined thereto to be displayed.

Figure 5:
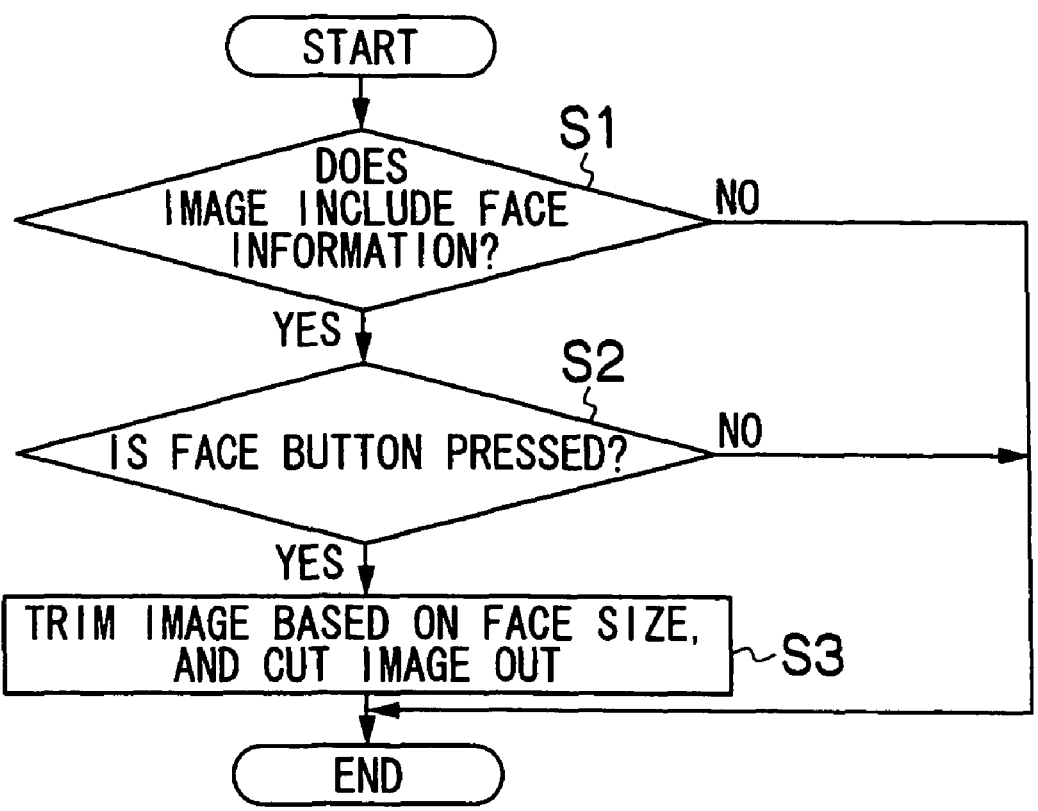
FIG. 5 is a flowchart showing processes for cutting out an image according to first to third embodiments.

Now, with reference to the flowchart of FIG. 5, a flow of cutting out processes which are executed by the CPU 20 will be explained below. The process starts in response to a turning on of a "trimming mode" followed by a turning on of an "image reproducing mode" by the operation section 120. The processes at S1 to S3 are repeatedly performed until the "trimming mode" is turned off The processes are also able to be performed on a through image which is obtained in a "photographing mode" (hereinafter, may be referred to as "quick enlargement").

Figure 6:
FIG. 6 is a view showing an example of image which is displayed by a cutting out process according to the first embodiment.

At S1, the display control section 20c displays a desired image which is read out from a memory card 200 (for example, "an entire image of one shot" of FIG. 6). The image to be displayed can be selected by a user as desired through the operating section 120.

The face information detecting section 20a detects face information from the displayed image. When the face information detecting section 20a detects at least two pieces of face information, the process goes to S2.

A start of a detection of face information during an image is being displayed may cause a problem in the process for quickly displaying the image. So if the face button 125 is pressed in a "photographing mode setting" period, face information should be detected at that point of time so that the detected face information is recorded in the memory card 200 with associated with the image for recording (for example, as header information or tag information of the image for recording). Then, at S1, instead of a detection of face information, a reading out of the face information with associated with the displayed image is attempted, and when it is determined that the face information is read out, the process may go to S2.

At S2, the display control section 20c starts the process at S3 in response to a detection of a pressing of the face button 125.

At S3, the display control section 20c determines a predetermined default cut out region based on the face information detected by the face information detecting section 20a, and cuts out the determined cut out region from the image. The cut out region is displayed as it is, or enlarged by a predetermined ratio, or is fit displayed (for example, the "enlarged face image" of FIG. 6).

Then, as in the case of known optional settings of a trimming region, in response to an operation by using the crosskey 124, the position, size, angle of view, and magnification of the determined cut out region can be further changed as desired value. The GUI through which a change of a cut out region is indicated may be displayed in any manner, and for example a changed cut out region itself may be previewed in the GUI, or with an original image being displayed without a change, a video image of a frame which shows a changed cut out region may be superimposed on the image on the display so that the cut out region can be changed by scaling and moving the frame in response to an operation by using the crosskey 124.

As described above, in the present embodiment, a predetermined default cut out region based on a face area is displayed, and then any optional change on the cut out region is accepted. Therefore, unlike a conventional case, a setting a cut out region by a user from the very beginning is not required, and a user is able to easily set a trimming region to include a person image and a face area at the center thereof, thereby the operation for individually moving a zoom frame to each face portion is eliminated.

A cut out region can be determined as follows for example.

Figure 7:
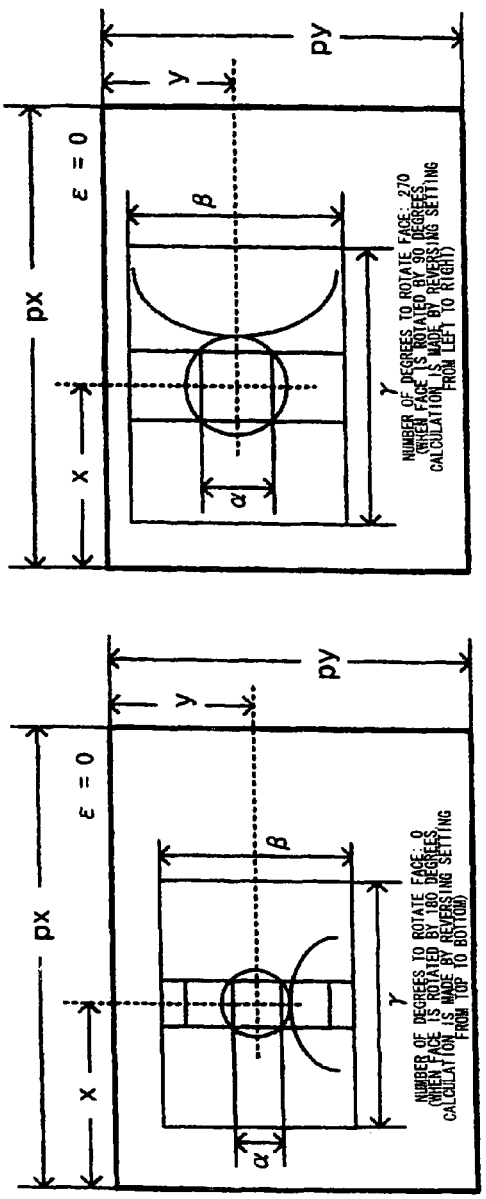
FIG. 7 is a view showing an example of determination reference of a cut out region.

As illustrated in FIG. 7, when an image has a face area which is a long in the vertical direction (by pixel) and is to be rotated by 0 degrees, first a cut out region is determined to be $\beta=4\alpha$ long in the vertical direction and be $\gamma=4\beta/3$ wide in the horizontal direction. Next, the cut out region which is $\beta$ long and $\gamma$ wide is determined to have the same center coordinate (x, y) as the center coordinate (x, y) of the face area. When the image is to be rotated by 180 degrees, a cut out region is determined as in the case with the rotation by 0 degrees, and then the region is rotated by 180 degrees after being cut out.

When the image is to be rotated by 270 degrees, first, a cut out region is determined to be $\beta=3\alpha$ long in the vertical direction and be $\gamma=4\beta/3$ wide in the horizontal direction. Next, the cut out region which is $\beta$ long and $\gamma$ wide is determined to have the same center coordinate (x, y) as the center coordinate (x, y) of the face area. When the image is to be rotated by 90 degrees, a cut out region is determined as in the case with the rotation by 0 degrees, and then the region is rotated by 90 degrees after being cut out.

Figure 8:
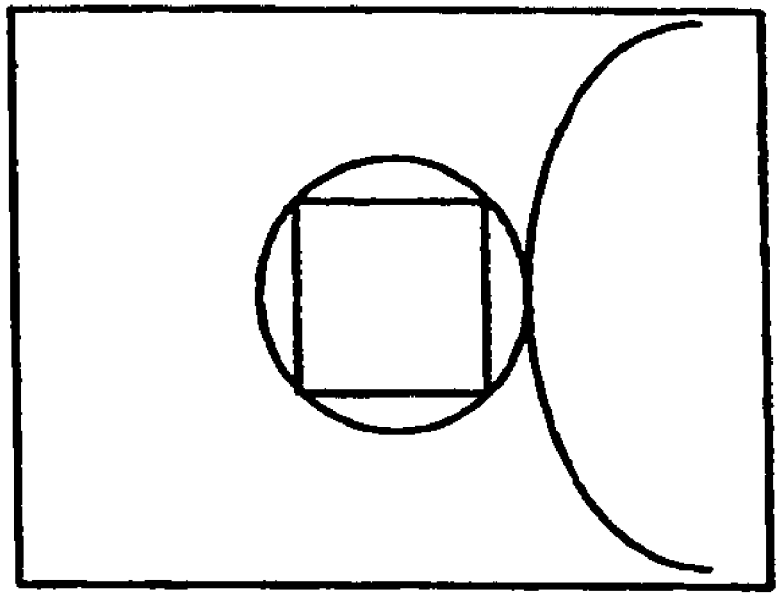
FIG. 8 is a view showing an example in which a cut out region has the almost same size as that of the photographed image.

Alternatively, a margin may be determined based on the face area, and for example, a margin $\delta$ may be calculated by multiplying $\alpha$ by a predetermined ratio (0 to 1.0). The margin $\delta$ is a constant which limits the above cutting out process because the cutting out process is useless when a cut out region has a length in the vertical direction and a width in the horizontal direction which are almost the same as those of the original image respectively. For example, when a cut out region show in FIG. 8 is determined, the cutting out process is not required.

Furthermore, when a plurality of face information is detected from one image, a predetermined cut out region may be determined based on the face information having the highest index for a predetermined priority such as face information having the highest probability or face information having the largest face area size.

Second Embodiment

In the first embodiment, a default cut out region is determined based on each one of detected face areas. However, when a plurality of face areas are detected, a default cut out region in which all of the face areas are included may be determined.

In other words, as illustrated in FIG. 9, when a plurality of face areas are detected from one image, such as three, seven, or two face areas, in any case, a default cut out region is determined to have a length, a width, and a coordinate of the cut out region so that the region includes all of the plurality of face areas of the image, and the determined cut out region is cut out from the image.

As a result, a trimming can be easily performed with the all of the faces being in the angle of view, and this is particularly useful in trimming of a group photo.

Third Embodiment

In the second embodiment, a cut out region is determined so that all of detected face areas are included therein, however, a cut out region may be serially determined based on a selected face area which is selected out of the faces in response to an indication from a user, so that the cut out regions are serially cut out to be displayed.

Figure 10:
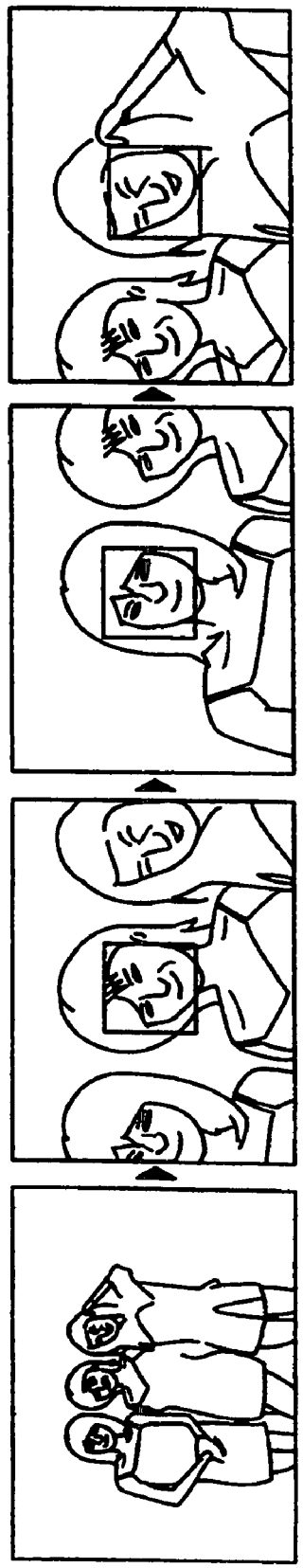
FIG. 10 is a view showing an example of image which is cut out and displayed by a cutting out process according to the third embodiment.

For example, as shown in FIG. 10, when three face areas are detected in one image, one of the face areas can be selected by moving a face detecting frame (or cursor) in response to pressings of the left or right side key of the cross button 124 or continuous pressings of the face button 125, and a default cut out region may be determined based on the selected face area in a manner similar to that of the first embodiment, so that the regions are serially cut out to be displayed.

Fourth Embodiment

In the first to third embodiments, when (i) a face area has a size which is too large and the cut out region thereof cannot be accommodated in a photographing image size, (ii) an enlarged cut out region cannot be accommodated in a photographed image size itself, (iii) a face area has a size which is too small and the cut out region thereof has a size smaller than a predetermined one (for example, VGA), the following processes may be performed.

(i) A case where a face area has a size that is too large and the cut out region thereof cannot be accommodated in a photographing image size (Formula 1 in FIG. 7 is not satisfied, that is, $\beta \geq py-\delta$):

A cutting out process similar to that in the first embodiment (which means a zoom factor/position assistance depending on a face position. Hereinafter, referred to as "trimming assistance") is performed with the conditions below being maintained. A cut out region is set around a face to have a length $\beta$ which is equal to or less than twice the value of $\alpha$, and the size of the cut out region should not be reduced.

Horizontal Photograph (0, 180 degrees) . . . $4\alpha \geq \beta \geq 2\alpha$
Vertical Photograph (90, 270 degrees) . . . $3\alpha \geq \beta \geq 2\alpha$ When a detected face has a large size (which is $1/1.2$ to $1/2.0$ of the shorter side of an image) and $\beta<2\alpha$, the trimming assistance is not performed. The trimming assistance functions to assist a trimming position and a magnification, and is useless when the entire image is occupied with a face, thereby the value of $\beta$ is limited to be equal to or less than twice the value of $\alpha$. This is applied only to the case in which a face area occupies a large percentage of an entire image ($1/1.2$ to $1/2.0$ of the shorter side of an image).

If the face button 125 is pressed while an "image reproducing mode" is turned on and a "trimming mode" is turned off, or while a "photographing mode" is turned on, a process which is similar to the trimming can be performed (quick enlargement). However, in the quick enlargement, the value of $\beta$ is limited to be equal to or less than the value of $\alpha$, and the size of the cut out region should not be reduced. In this case, since the main purpose is to ensure face expression and focusing of the image, the value of $\beta$ is not limited to be equal to or less than twice the value of $\alpha$. However, because there is no point in an enlargement of only a nose part of a face for example, the value of $\beta$ is limited to be equal to or less than the value of $\alpha$.

Figure 11:
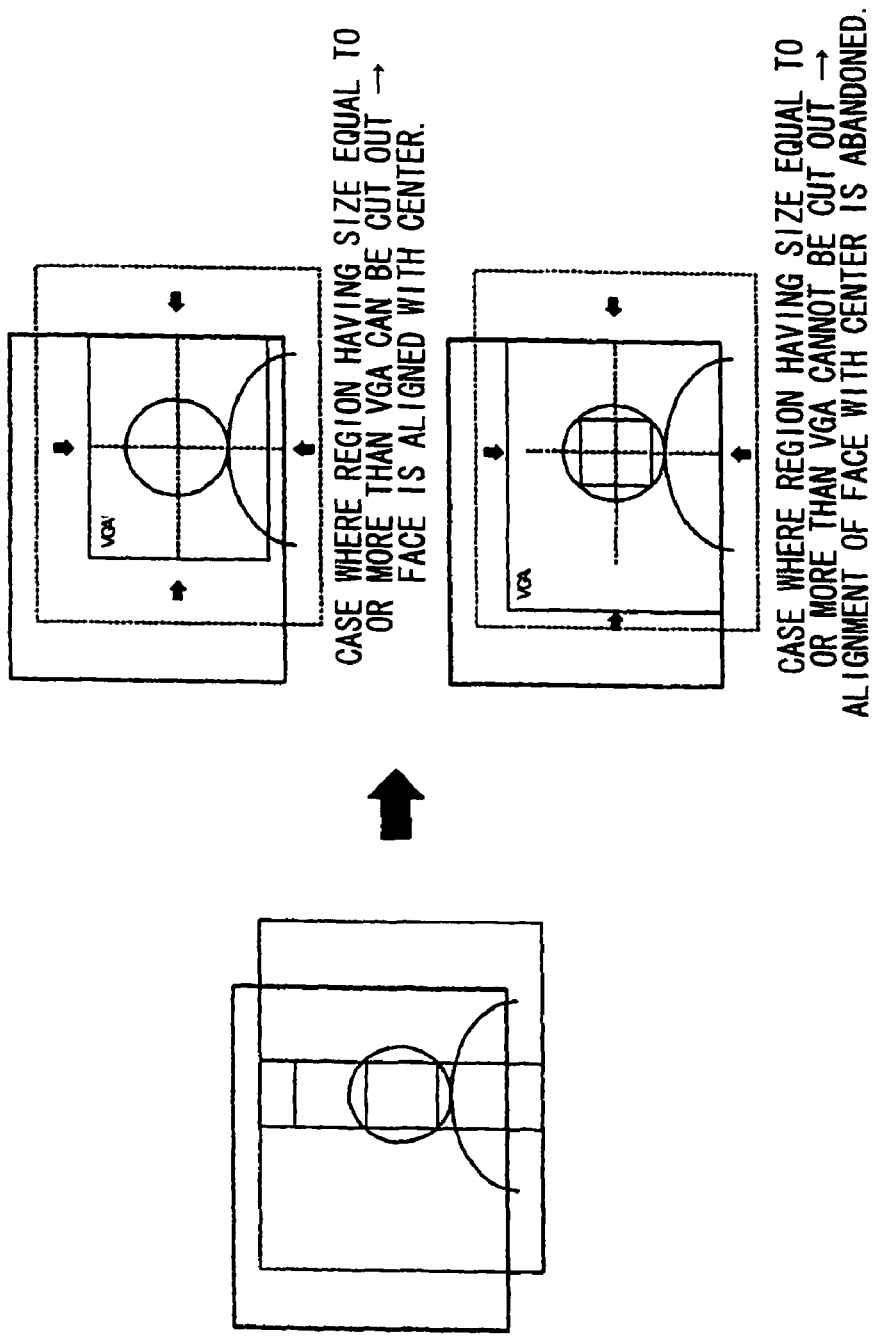
FIG. 11 is a view showing an example in which a cut out region is determined so that the cut out region is accommodated within its original image with the alignment of face with the center of the region being abandoned.
Figure 12:
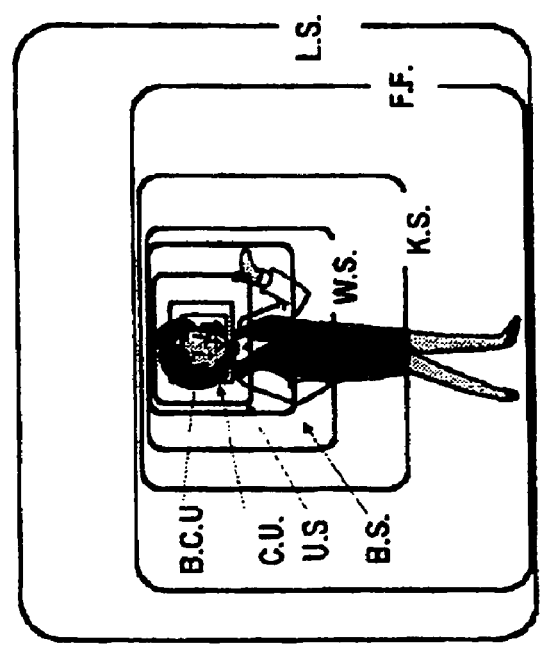
FIG. 12 is a view showing an enlargement of a cut out size to have a size larger than a predetermined size.

Horizontal Photograph (0, 180 degrees) . . . $4\alpha \geq \beta \geq \alpha$
Vertical Photograph (90, 270 degrees) . . . $3\alpha \geq \beta \geq \alpha$ (ii) A case where a cut out region cannot be accommodated in a photographed image size (the case that does not satisfy the conditions of Formula 2 and 3 of FIG. 7):

When a cut out region cannot be accommodated in the original image thereof after trimming/quick enlargement, as shown in FIG. 11, the alignment of the center coordinate of the face area to the center of the cut out region is abandoned, and the cut out region is arranged to be accommodated within the original image.

(iii) A case where a face area has a size that is too small and the cut out region thereof has a size smaller than a predetermined one (for example, VGA) ($\beta<480$):

When a face area has a small size and even a composition of a photograph of an upper body of an object person has a cut out size that is equal to or smaller than VGA, in order to increase the cut out size to VGA, the cut out region is enlarged downward in the direction vertical to the face. The downward enlargement is performed to generate a photograph of an upper body of an object person o a photograph of a waist of the object person (upper body from waist)→a photograph of knees of the object person (upper body from knees)→a photograph of the full body of the object person (entire body). When a cut out region reaches an end of its original image, and if the region reaches the lower end of the original image in the direction vertical to the face, the region is enlarged upward, and if the region reaches the left or right end of the original image, the region is enlarged in the opposite direction (in the same manner as that in the case where a region has a size larger than VGA and cannot be cut out. Because the region is enlarged downward, the alignment of the face with the center is abandoned from the beginning).

The above condition is only applied to the case where a photographing has a size of 0.3M or more (horizontal photograph: 1920×1440, vertical photograph: 2560×1920) and a detected face has a small size (for example, $1/12$).

Figure 13:
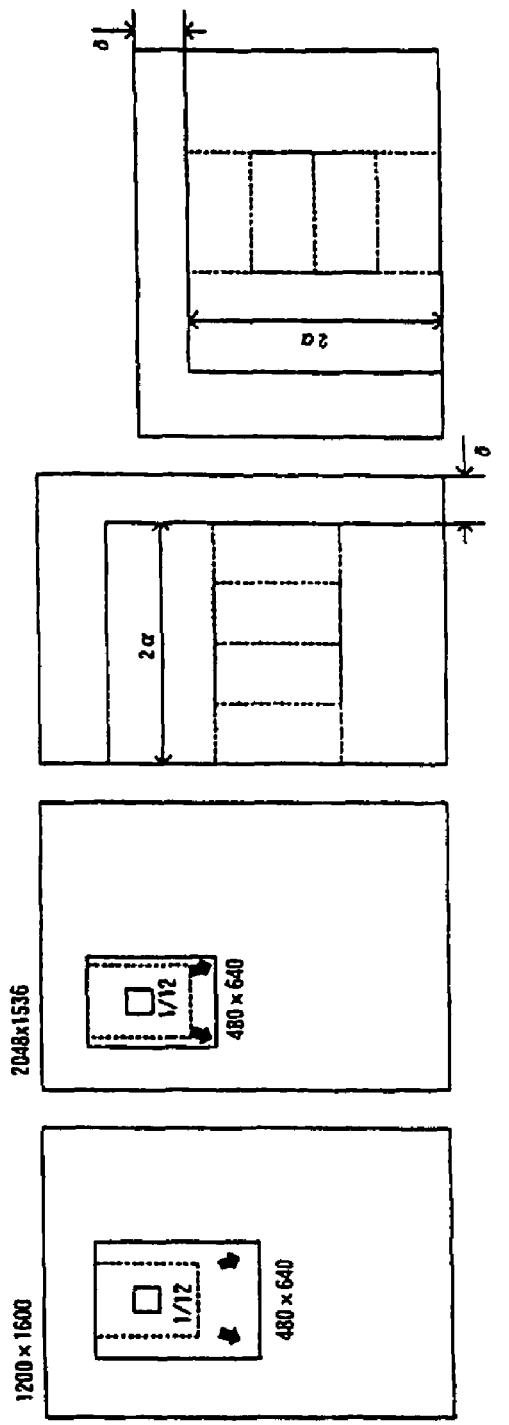
FIG. 13 is a view showing an example of maximum and minimum cut out regions for trimming a photograph of an upper body of an object person.
Figure 14:
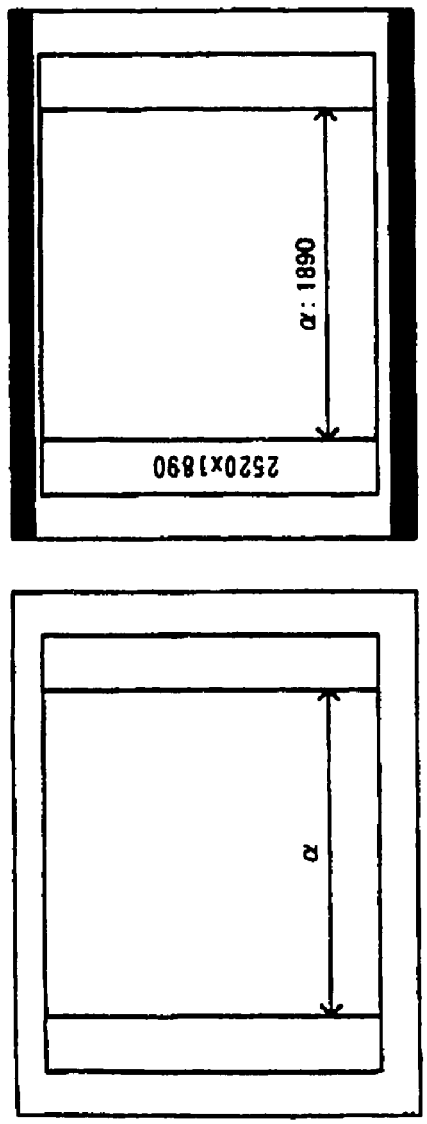
FIG. 14 is a view showing an example of a maximum cut out region by quick enlargement.

FIG. 13 shows an example of a minimum cut out region, while FIG. 14 shows an example of a minimum quick enlargement region.

What is claimed is:

1. An image trimming apparatus, comprising:
   a reading device which reads out an original image to be trimmed from an original recording device in which the original image is recorded;
   a displaying device which displays an image based on the read out original image;
   a manual trimming indicating device which indicates a trimming region by a manual operation with respect to the image displayed on the displaying device;
   an automatic trimming indicating device which, when the read out original image includes a face image of a person, automatically indicates a predetermined trimming region having the face image at the time of the manual operation; and
   a trimming device which cuts out the image within the trimming region indicated by the manual trimming indicating device or the automatic trimming indicating device from the original image of the image displayed on the displaying device, wherein, when indicating a size of a photograph of an upper body of an object person as the predetermined trimming region, the automatic trimming indicating device automatically indicates the predetermined trimming region by making the center of the predetermined trimming region the center of the face image, if the vertical length of the predetermined trimming region is twice or larger than the vertical length of the face image and $\beta \geqq py-\delta$ is satisfied where the vertical length of the predetermined trimming region is $\beta$, the vertical length of the original image is py, and margin is $\delta$.

2. The image trimming apparatus according to claim 1, wherein the automatic trimming indicating device, in case the original image is horizontally photographed, when indicating an upper body of an object person as the predetermined trimming region, automatically indicates the predetermined trimming region by making the center of the predetermined trimming region the center of the face image if the vertical length of the predetermined trimming region is twice or more to four times or less than the vertical length of the face image and $\beta \geqq py-\delta$ is satisfied.

3. The image trimming apparatus according to claim 2, wherein when the vertical length of the face image is $\alpha$, the vertical length of the photograph of an upper body is $\beta$, and the horizontal length of the photograph of an upper body is $\gamma$, $\beta=4\alpha$ and $\gamma=4\beta/3$ are satisfied.

4. The image trimming apparatus according to claim 1, wherein the automatic trimming indicating device, in case the original image is vertically photographed, when indicating an upper body of an object person as the predetermined trimming region, automatically indicates the predetermined trimming region by making the center of the predetermined trimming region the center of the face image if the vertical length of the predetermined trimming region is twice or more to three times or less than the vertical length of the face image and $\beta \geqq py-\delta$ is satisfied.

5. The image trimming apparatus according to claim 4, wherein when the vertical length of the face image is $\alpha$, the vertical length of the photograph of an upper body is $\beta$, and the horizontal length of the photograph of an upper body is $\gamma$, $\beta=3\alpha$ and $\gamma=4\beta/3$ are satisfied.

6. The image trimming apparatus according to claim 1, wherein the automatic trimming indicating device enlarges the predetermined trimming region in a vertical direction of the face image to create an enlarged predetermined trimming region, in case the size of the predetermined trimming region is lower than a predetermined size of a photograph of an upper body of an object person when an upper body of an object person is indicated as the predetermined trimming region.

7. The image trimming apparatus according to claim 6, wherein in case the enlarged predetermined trimming region does not fit in the original image if a size of a photograph of an upper body of an object person is indicated as the predetermined trimming region by making the center of the predetermined trimming region the center of the face image, the center of the predetermined trimming region is not made the center of the face image of a person so that the enlarged predetermined trimming region does not become larger than the original image.

8. The image trimming apparatus according to claim 1, wherein the displaying device displays the image cut out with the trimming device.

9. The image trimming apparatus according to claim 1, further comprising:

a recording device which records the image cut out by the trimming device.

10. The image trimming apparatus according to claim 1, wherein the manual trimming indicating device includes a zoom indicating device which indicates a zoom factor for change the size of the image displayed on the displaying device, and a movement indicating device which causes enlarged image displayed on the displaying device to be moved to another position within the region of the original image.

11. The image trimming apparatus according to claim 1, wherein when the read out original image includes a plurality of faces of persons, the automatic trimming indicating device selects a face of one of the persons on the basis of a manual operation to be the face image, and automatically indicates a predetermined trimming region which includes the selected face image of the person.

12. The image trimming apparatus according to claim 2, wherein when the read out original image includes a plurality of face of persons, the automatic trimming indicating device selects a face of one of the persons on the basis of a manual operation to be the face image, and automatically indicates a predetermined trimming region which includes the selected face image of the person.

13. The image trimming apparatus according to claim 3, wherein when the read out original image includes a plurality of face of persons, the automatic trimming indicating device selects a face of one of the persons on the basis of a manual operation to be the face image, and automatically indicates a predetermined trimming region which includes the selected face image of the person.

14. The image trimming apparatus according to claim 4, wherein when the read out original image includes a plurality of face of persons, the automatic trimming indicating device selects a face of one of the persons on the basis of a manual operation to be the face image, and automatically indicates a predetermined trimming region which includes the selected face image of the person.

15. The image trimming apparatus according to claim 5, wherein when the read out original image includes a plurality of face of persons, the automatic trimming indicating device selects a face of one of the persons on the basis of a manual operation to be the face image, and automatically indicates a predetermined trimming region which includes the selected face image of the person.

16. The image trimming apparatus according to claim 8, wherein when the read out original image includes a plurality of face of persons, the automatic trimming indicating device selects a face of one of the persons on the basis of a manual operation to be the face image, and automatically indicates a predetermined trimming region which includes the selected face image of the person.

17. The image trimming apparatus according to claim 1, wherein the automatic trimming indicating device, in case the original image is horizontally photographed, enlarges the size of the predetermined trimming region in comparison to the size of the original image when indicating an upper body of an object person as the predetermined trimming region, and the automatic trimming indicating device automatically indicates the predetermined trimming region by making the center of the predetermined trimming region as the center of the face image if the vertical length of the predetermined trimming region is twice or more to four times or less larger than the vertical length of the face image.

18. The image trimming apparatus according to claim 17, wherein when the vertical length of the face image is $\alpha$, the vertical length of the photograph of an upper body is $\beta$, and the horizontal length of the photograph of an upper body is $\gamma$, $\beta=4\alpha$ and $\gamma=4\beta/3$ are satisfied.

19. The image trimming apparatus according to claim 1, wherein the automatic trimming indicating device, in case the original image is vertically photographed, enlarges the predetermined trimming region in comparison to the size of the original image when indicating an upper body of an object person as the predetermined trimming region, and the automatic trimming device automatically indicates the predetermined trimming region by making the center of the predetermined trimming region as the center of the face image if the vertical length of the predetermined trimming region is twice or more to three times or less larger than the vertical length of the face image.

20. The image trimming apparatus according to claim 19, wherein when the vertical length of the face image is $\alpha$, the vertical length of the photograph of an upper body is $\beta$, and the horizontal length of the photograph of an upper body is $\gamma$, $\beta=4\alpha$ and $\gamma=4\beta/3$ are satisfied.

* * * * *